United States Patent

[11] 3,588,805

| [72] | Inventor | John Joseph Davin<br>R.D. #2, Box 214, Troy, N.Y. 12182 |
|---|---|---|
| [21] | Appl. No. | 806,103 |
| [22] | Filed | Mar. 11, 1969 |
| [45] | Patented | June 28, 1971 |

[54] HIGHWAY INTERSECTION WARNING SYSTEM
6 Claims, 4 Drawing Figs.

| [52] | U.S. Cl. | 340/31R |
|---|---|---|
| [51] | Int. Cl. | G08g 1/02 |
| [50] | Field of Search | 340/31, 35, 36, 38, 39, 38 (L) |

[56] References Cited
UNITED STATES PATENTS

| 1,946,435 | 2/1934 | Bissell | 340/36 |
|---|---|---|---|
| 3,266,013 | 8/1966 | Schmidt | 340/31 |
| 3,325,782 | 6/1967 | Der | 340/31 |
| 3,371,314 | 2/1968 | Wright | 340/39 |
| 3,431,553 | 3/1969 | Osmond | 340/31 |

*Primary Examiner*—Kathleen H. Claffy
*Assistant Examiner*—Randall P. Myers
*Attorney*—Matthew M. Russo ABSTRACT: An intersection warning system wherein a pair of spaced-apart treadle-type switches are disposed in one of the roads. The first switch is electrically arranged to activate a light warning system on both roads. This is inactivated when the intersection is clear and the vehicle passes over the second treadle. When adapted to an exit ramp the two switches activate time delay relays so that when the vehicle passes over the second switch within a selectable time the warning system does not operate. However, when the vehicle is delayed or slowed the warning system operates. One set of treadles is disposed at the ramp terminal and the other proximate the ramp entrance. Where an automobile attempts to enter the exit ramp in the wrong direction the second switch is tripped and the alarm activated. The warning system consists of lamps carried on poles along the ramp. The entrance treadles activate warning lights along the highway to inform oncoming motorists of the ramp condition.

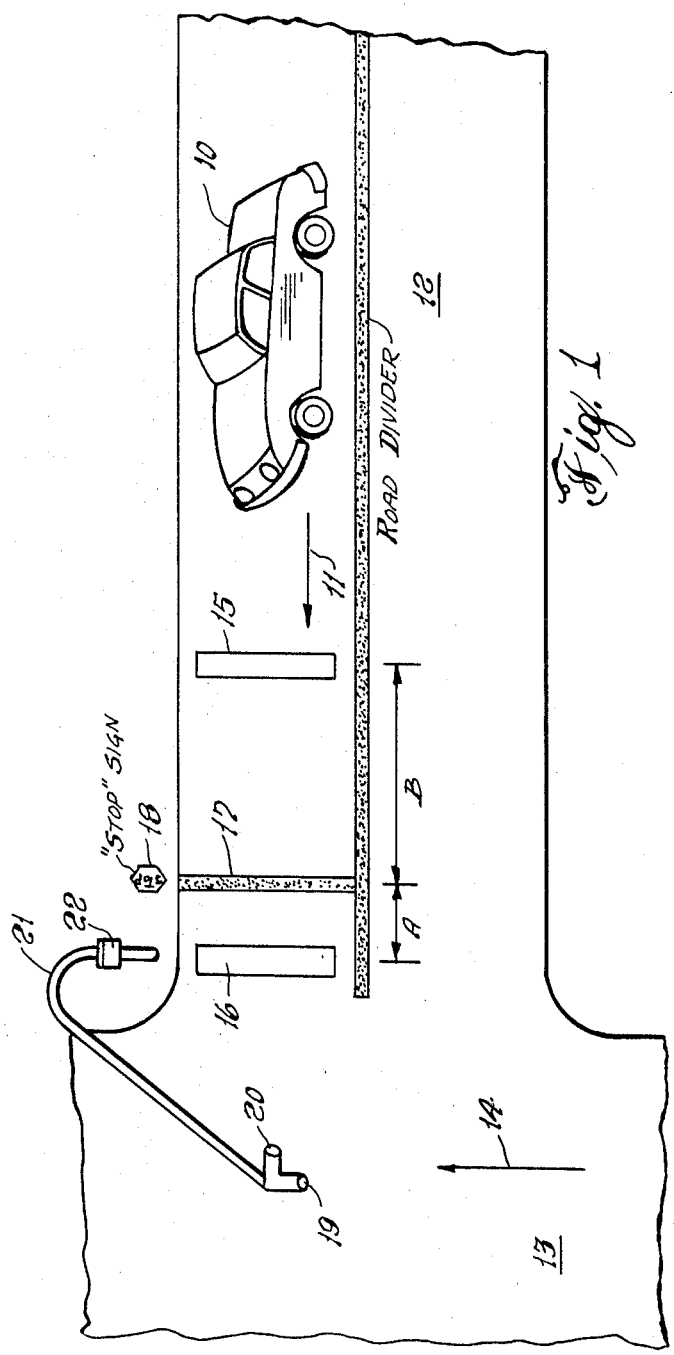
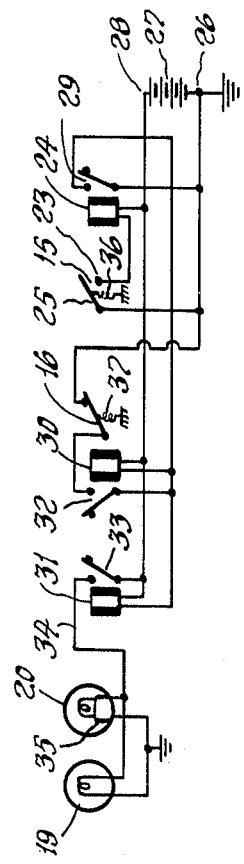
INVENTOR.
JOHN J. DAVIN

Patented June 28, 1971

INVENTOR.
JOHN J. DAVIN

3,588,805

HIGHWAY INTERSECTION WARNING SYSTEM

BACKGROUND OF THE INVENTION

1. Field of the Invention

The present invention relates to warning systems and more particularly pertains to warning systems for motorists approaching an intersection or exiting from a super highway wherein treadle switches are disposed in the road and electrically associated to activate warning lights or other devices where a hazardous condition exists.

2. Description of the Prior Art

In the field of vehicle warning and control systems it has been the general practice to employ stationary simple warning signs or cyclically operable traffic lights or manual police operation to perform these warning functions. Such devices have been unsatisfactory in that they are unable to accommodate to changing traffic conditions and cannot be easily altered. The present invention overcomes these deficiencies.

SUMMARY OF THE INVENTION

The general purpose of this invention is to provide a motor vehicle warning system that has all the advantages of similarly employed prior art devices and has none of the above described disadvantages. To attain this the present invention provides a unique arrangement of road treadle switches which electrically cooperate to activate warning devices. These switches and their associated components operate to set the warning system into operation only when a vehicle moves too slowly or is proceeding in the wrong direction. Additionally, the system warns motorists at an intersection of an approaching vehicle, the above is accomplished by having the switch controlled relays operative in sequence and with a selectable time delay.

An object of this invention is to provide a motor vehicle warning system for a highway intersection which alerts motorists in both directions and which is relatively simple, reliable, inexpensive and readily adaptable to different types of intersections.

Another object of the present invention is to provide a simple, reliable and foolproof motorist warning system to indicate that a vehicle is proceeding in the wrong direction along an exit ramp.

Still another object is to provide an exit ramp condition warning system for motorists approaching the ramp.

Other objects and many of the attendant advantages of this invention will be readily appreciated as the same becomes better understood by reference to the following detailed description when considered in connection with the accompanying drawings.

BRIEF DESCRIPTION OF THE DRAWINGS

FIG. 1 is a perspective representation of a highway intersection wherein an embodiment based on the principle of this invention has been installed:

FIG. 4 is a schematic diagram of the electrical components employed in the embodiment of FIG. 3.

BRIEF DESCRIPTION OF PREFERRED EMBODIMENTS

Figure 2:
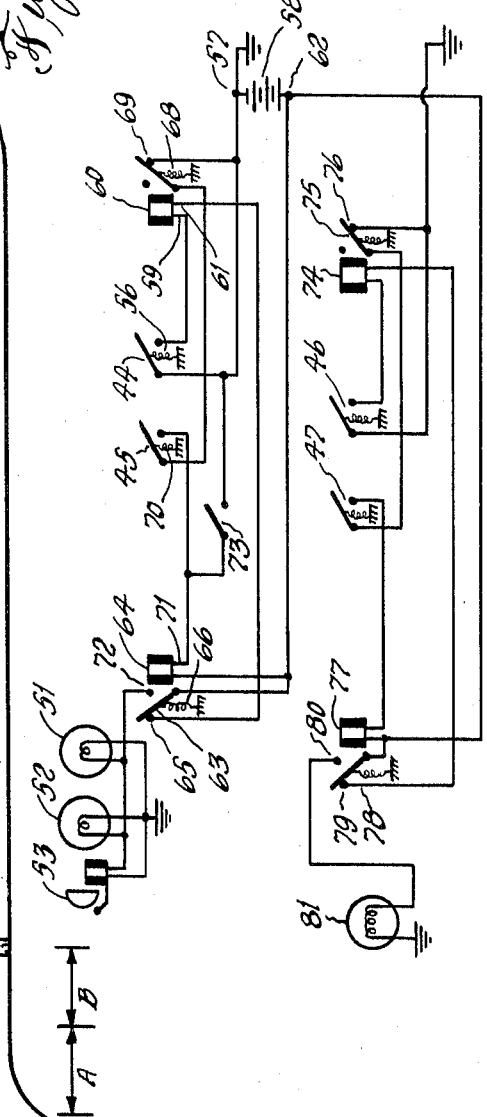
FIG. 2 is a schematic diagram of the electrical components employed in the embodiment of FIG. 1.

In the illustrated embodiment of FIGS. 1 and 2 a motor vehicle 10 proceeding in direction 11 along a divided road 12, which intersects an unlimited high speed highway 13 on which traffic is moving in a direction 14, first approaches a switch 15. This switch 15 may be of the road level treadle-type as shown or of an overhead magnetic or photoelectric variety as may all the other switches hereinafter described. Road switch 16 is located proximate the physical intersection of the roads but on the same side of and on divided road 12. Between these two road switches, the road is provided with a painted stop or warning stripe 17 and a stop sign 18. These switches are electrically associated with warning lights 19 and 20 which are supported centrally at the highway intersection thereabove on a support pole 21. Light 19 is directed to viewed by vehicle operators travelling along highway 13 while light 20 is directed toward those approaching the intersection along road 12. The pole 21 also carries a control operating panel 22 whose internal circuitry is illustrated in FIG. 2.

With the treadle switches 15 and 16 disposed on one side of the road divider, a vehicle 10 approaching the intersection first closes the switch 15 (SPST) whose one stationary contact 23 is connected to the winding of relay 24 and whose movable arm 25 is connected to one terminal 26 of an electrical power source which may be AC or as illustrated a battery 27. The other end of the relay winding is connected to the opposite battery terminal 28. The normally open contacts 29 of the relay are closed when switch 15 closes, by the activation of the relay. This relay contact supplies power to one side of each of the windings of relays 30 and 31 whose other sides are connected to the terminal 28 of the power source 27. This action activates these relays and causes their normally open contacts 32 and 33 to close, with contacts 33 closed energy is supplied to the lamps 19 and 20 via lead 34. Lamp 20 is provided with a thermal flasher 35 which causes this lamp to flash when energized. It is customary to have an amber light at lamp 19 and a red light at lamp 20. Road switch 15 is provided with a biasing coil spring 36 which returns it to the open position when the wheels of vehicle disengage the treadle. Although relay 24 is deenergized, relays 30 and 31 remain energized since normally closed treadle switch 16 supplies the other power terminal 26 through contacts 32. This permits these lights to continue their warning signals. Vehicle 10 proceeds to stop sign 18 and the warning stripe 17 at which point he stops, observes the traffic at the intersection, and then proceeds when road conditions are safe. As the vehicle proceeds across the intersection its wheels engage normally closed treadle switch 16 which is biased closed by coil spring 37 and causes it to open momentarily thus deactivating relays 30 and 31 removing energy from the lamps and returning the entire warning system to its normal "off" position. The spatial relationship between the stop sign 18 (stripe 17) and switch 16 namely A should be of the order of 3—5 feet while the distance B should be approximately 12 to 15 feet.

Figure 3:
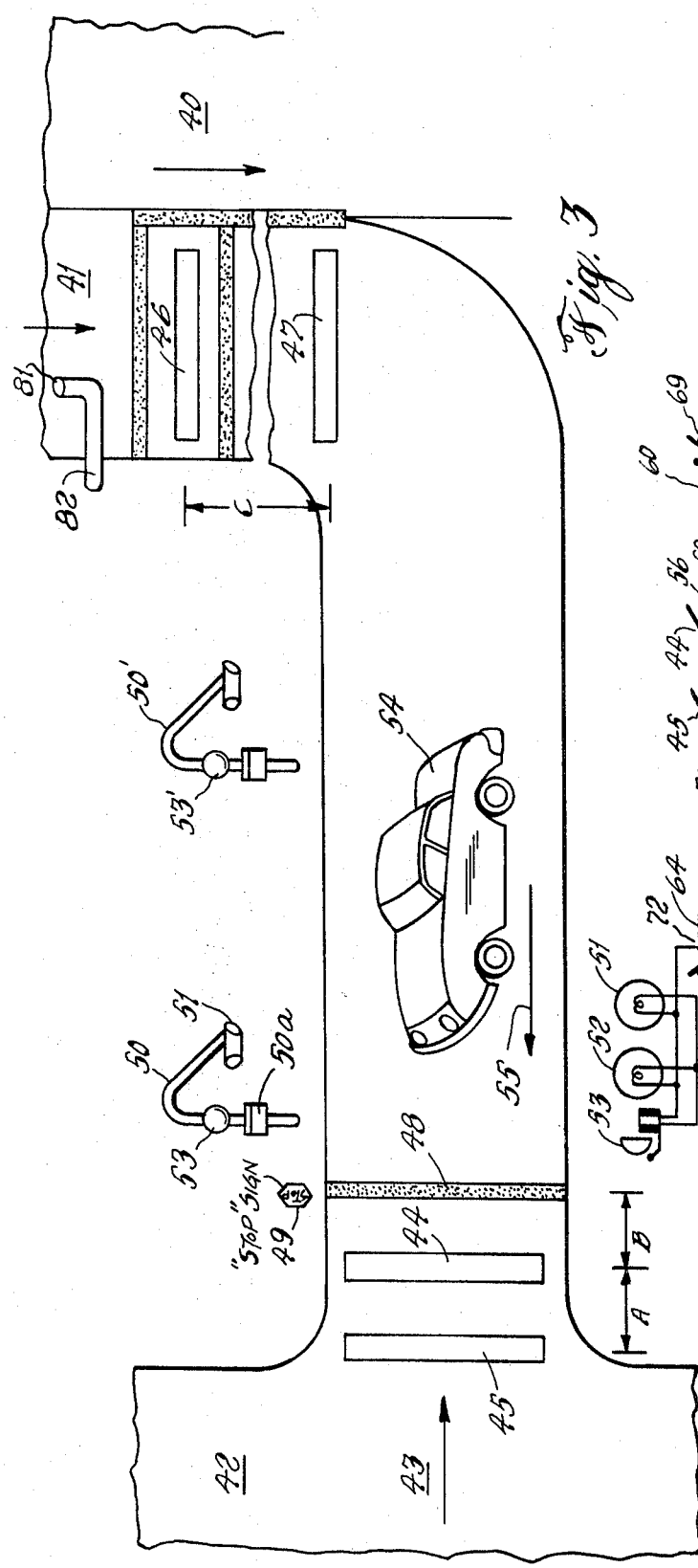
FIG. 3 is a perspective representation of an exit ramp wherein an embodiment based on the principle of the present invention has been installed.

In the illustrated embodiment of FIG. 3 a limited access or super highway 40, on which traffic is proceeding in the direction indicated, is provided with an exit ramp 41 which follows along the highway 40 and then turns laterally away and intersects another road 42 at the intersection 43. This one-way exit ramp is provided with a spaced apart pair of treadle switches 44 and 45 at its terminal end and a pair of exit treadle switches 46 and 47 at its initial end. Just forward of switch 44, the exit ramp is painted with a stripe 48 and an adjacent stop sign 49. A pole 50 which carries a pair of lamps 51 directed to an exiting vehicle and lamp 52 directed toward a vehicle entering the exit ramp and if desired a bell, gong 53 or other warning device, is positioned inwardly of the ramp so as to be visible prior to an exiting vehicle reaching the stop sign. Additional such poles and lights could be spaced along the exit ramp where necessary and also carry control panels 50a which contain the circuitry of FIG. 4 or similar circuitry.

An exiting vehicle 54 proceeding in a proper direction 55, stops at stripe 48, and then proceeds when conditions permit. As the wheels of the vehicle pass over normally open switch 44, which is biased open by coil spring 56 (see FIG. 4), the contacts close and terminal 57 of the electrical source 58 is connected on one side 59 of the winding of relay 60. The other side 61 of the winding is connected to the other terminal 62 of the source 58 via the movable arm 63 of relay 64 which is normally biased against contact 65 by spring 66. With relay 60 energized by the closing of switch 44, movable arm 67, which is normally biased by spring 68 into engagement with contact 69, moves into its open position and effectively inactivates treadle switch 44. This relay 60 is provided with an adjustable delay which may be of the thermal, electrical or mechanical variety. Suitable time delay relays are commercially available and permit variable period delays. A satisfactory delay herein would be one that held relay 60 energized (switch 45 inactive) until the vehicle had cleared switch 45 and thereafter released to normalize switch 44 and relay 60. Under these conditions it is quite clear that the warning system would remain inactive.

Considering now the extremely hazardous condition of a vehicle entering the exit ramp 41 from the intersection 43. Such a vehicle would first trip and close normally open switch 45 which is biased by coil spring 70. Since switch 44 is still open, terminal 57 of the source would be applied to one end 71 of the winding of relay 64 via contact 69, and arm 67, closed switch 45 and thus energize this relay to move arm 63 into abutment with contact 72 and thus supply power to lamps 51, 52 and alarm 53. These lamps can be of the flashing-type so as to more readily alert both the exiting vehicles and the wrong way driver. Since relay 64 is also of an adjustable time delay its contacts will hold in its energized position and allow the lights and alarm to signal even after the vehicle has passed over switch 44. This should be a relatively long warning period as compared to the delay of relay 60. It should be noted that the more warning poles along the exit ramp the more efficient and safer the system. After the warning period the system returns automatically to its normal or ready position. SPST switch 73 has been included to provide manual operation of the warning system should this become necessary to expedient.

A circuit similar to that described hereinabove is employed to warn motorists on the super highway that the exit ramp is slowed or blocked up. The treadle switches 46 and 47 are disposed so that when a vehicle closes normally open switch 46, relay 74 is energized and its contacts, arm 75 and contact 76, open circuit and thereby deactivate normally open switch 47. Since this relay deenergizes with a time delay, the vehicle immediately passing over switch 47 does not activate the system. However, if the vehicle is travelling slowly or blocked it fails to pass over treadle 47 before relay 74 releases. With relay 47 deenergized and switch closed, relay 77 is energized via switch 47, arm 75 and contact 76, thus pulling arm 78 from its biased position against contact 79 to contact 80. This action applies energy to light the warning lamp 81 which is carried on a pole 82 some distance down the highway so as to warn motorists before they enter the exit lane.

It should be understood, of course, that the foregoing disclosure relates to only preferred embodiments of the invention and that numerous modifications or alterations may be made therein without departing from the spirit and the scope of the invention as set forth in the appended claims.

I claim:

1. A traffic warning system for use at the intersection of two highways which comprises:

normally open switch means for sensing the passage of a motor vehicle and closing said normally open switch by said passage, said normally open switch being disposed on one of said highways to sense vehicles approaching and spaced from said intersection, normally closed switch means for sensing the passage of a motor vehicle and opening said normally closed switch by said passage, said normally closed switch being disposed on said one of said highways proximate said intersection, a source of electrical energy having a pair of terminals, first, second and third relays each having a relay winding and a pair of normally open contacts controlled by their said relay, first electrical means connecting one side of each of said windings and one contact of said third relay to one of said pair of terminals, second electrical means connecting the other side of each of the said windings of said second and third relays in series with said contacts of said first relay and the other of said pair of terminals, third electrical means connecting said other side of said windings of said second and third relays each in series with said contacts of said second relay, said normally closed switch means and said other of said pair of terminals;

electrically activated indicator warning means for signaling the operators of vehicles approaching said intersection that a potentially hazardous condition may exist;

fourth electrical means connecting said other contact of said third relay for activating said indicator means when said contacts of said third relay close, fifth electrical means connecting said other side of said winding of said first relay in series with said normally open switch means and said other of said pair of terminals, whereby when a motor vehicle proceeding toward said intersection first closes said normally open sensing switch and activates said warning means, when said motor vehicle safely proceeds into said intersection it opens said normally closed sensing switch said warning means is inactivated.

2. The warning system according to claim 1 wherein said indicator warning means includes a pair of traffic lights one of which is directed toward each of said highways from said intersection.

3. A warning system for an exit ramp from a limited access highway which ramp terminates at another highway and which comprises:

first and second normally open switch means for sensing the passage of a motor vehicle and closing said switch means by said passage, said switch means disposed in linear spaced apart relation in said ramp proximate the intersection of said ramp and said another highway, a source of electrical energy having a pair of terminals, a first selectable time delay relay having a winding and a pair of normally closed contacts controlled by said first relay, a second selectable time delay relay having a winding and a single pole double throw contact switch controlled by said second relay, said switch normally biased with said pole contacting one of said switch contacts, first electrical means connecting in series one terminal of said source, said normally closed contacts of said first relay, said first normally open switch means closest said intersection, said winding of said second relay and the other of said terminals, second electrical means connecting in series said one of said terminals, said second normally open switch means, said winding of said first relay, said one switch contact and said pole of said double throw switch, said other of said terminals, electrically activated indicator warning means for signalling operators of vehicles travelling along said ramp that a vehicle is proceeding along said ramp in the wrong direction, third electrical means connecting the other switch contact of said double throw switch with said warning means for activating the same by said source, whereby when a motor vehicle enters said ramp from said another highway it will close said contacts of said first switch means and thereby activate said warning means whereas a vehicle proceeding in the correct direction will not activate said warning system when the delay of said second switch means is longer than that of said first switch means.

4. The warning system according to claim 3 further including:

third and fourth normally open switch means for sensing the passage of a motor vehicle and closing said switch means by said passage, said switch means disposed in linear spaced apart relation in said ramp proximate said limited access highway, a third selectable time delay relay having a winding and a pair of normally closed contacts controlled by said third relay, a fourth selectable time delay relay having a winding and a single pole double throw contact switch controlled by said fourth relay, said switch normally biased with said pole contacting one of said switch contacts, fourth electrical means connecting in series the negative terminal of said source said normally closed contacts of said third relay, said third normally open switch means most distant said limited access highway, said winding of said fourth relay and said other terminal, fifth electrical means connecting in series the negative terminal of said source, said fourth normally open switch means, said winding of said third relay, said one switch contact and said pole of said double throw switch of said fourth relay, and said other terminal, electrically activated ramp condition indicator means for signaling operators of vehicles approaching said ramp along said limited access highway, sixth electrical means connecting the other switch contact of said double throw switch of said fourth relay with said ramp condition indicator means for activating the same.

5. The warning system according to claim 4 wherein said ramp condition indicator means includes signal lights carried by a pole and directed to be viewed by drivers of vehicles on said limited access highway approaching said exit ramp.

6. The warning system according to claim 5 wherein the time delay period of said third relay is less than that of the fourth relay.